United States Patent
Bolton et al.

(10) Patent No.: US 10,348,836 B2
(45) Date of Patent: Jul. 9, 2019

(54) MIGRATING CLIENTS BETWEEN SERVERS

(71) Applicant: Microsoft Technology Licensing, LLC, Redmond, WA (US)

(72) Inventors: Ian Charles Bolton, Ashby-de-la-Zouch (GB); Colin Richard Gulliver, Nottingham (GB); David Robert Allmond, Ashby-de-la-Zouch (GB); Richard Michael Semmens, Long Eaton (GB); Robert Stothard, Stafford (GB); Alex James Neves, Leicester (GB); John Paul Bradshaw, Ashby-de-la-Zouch (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 194 days.

(21) Appl. No.: 15/439,661

(22) Filed: Feb. 22, 2017

(65) Prior Publication Data
US 2018/0241825 A1    Aug. 23, 2018

(51) Int. Cl.
G06F 15/16    (2006.01)
H04L 29/08    (2006.01)
H04L 29/06    (2006.01)

(52) U.S. Cl.
CPC ............ H04L 67/148 (2013.01); H04L 67/42 (2013.01)

(58) Field of Classification Search
CPC ............................... H04L 67/148; H04L 67/42
See application file for complete search history.

(56) References Cited

U.S. PATENT DOCUMENTS

| 6,377,996 | B1 |  | 4/2002 | Lumelsky et al. |
| 7,155,462 | B1 |  | 12/2006 | Singh et al. |
| 7,254,634 | B1 | * | 8/2007 | Davis ................ G06F 11/203 709/227 |
| 7,552,218 | B2 |  | 6/2009 | Kaluskar et al. |
| 7,657,628 | B1 | * | 2/2010 | McDysan .......... G06F 11/2028 370/401 |

(Continued)

FOREIGN PATENT DOCUMENTS

| CN | 105376332 A | 3/2016 |
| EP | 1895412 A1 | 3/2008 |

OTHER PUBLICATIONS

"International Search Report and Written Opinion Issued in PCT Application No. PCT/US18/017728", dated May 2, 2018, 10 pages.

(Continued)

*Primary Examiner* — John B Walsh

(57) ABSTRACT

Methods of migrating clients from a first server to a second server are described. The first server sends a message to the second server identifying a set of clients to be migrated, serializes the state of one or more objects associated with the set of clients and transmits the serialized state to the second server. The first server then instructs each client in the set of clients to establish a connection to the second server such that each client is connected in parallel to both the first and second servers with the connection to the first server as a primary connection and the connection to the second server as a secondary connection and when the clients are connected to the second server, the first server instructs the clients to disconnect from the first server and switch the primary connection to be the connection with the second server.

20 Claims, 6 Drawing Sheets

(56) References Cited

U.S. PATENT DOCUMENTS

| | | | |
|---|---|---|---|
| 7,840,683 B2 | 11/2010 | Zhang | |
| 8,360,855 B2 | 1/2013 | Kniberg et al. | |
| 8,556,724 B2 | 10/2013 | Dale et al. | |
| 2009/0125589 A1* | 5/2009 | Anand | H04L 65/1083 709/204 |
| 2010/0306381 A1* | 12/2010 | Lublin | G06F 15/16 709/226 |
| 2017/0185437 A1* | 6/2017 | Thomas | G06F 9/45558 |

OTHER PUBLICATIONS

"Moving or Migrating Users between Locations in Cisco Unity Connection 9.x", http://www.cisco.com/c/en/us/td/docs/voice_ip_comm/connection/9x/user_mac/guide/9xcucmacx/9xcucmac130.pdf, Retrieved on: Nov. 30, 2016, 4 pages.

"Running in a parallel setup with two Exchange Servers", http://emailsignature.xink.io/support/solutions/articles/1000147106-running-in-a-parallel-setup-with-two-exchange-servers, Published on: Mar. 9, 2015, 2 pages.

"Using the Move Tool to Migrate Worry-Free Business Security (Wfbs) Clients to a New Server", https://success.trendmicro.com/solution/1037742-using-the-move-tool-to-migrate-worry-free-business-security-wfbs-clients-to-a-new-server, Published on: Jul. 13, 2016, 4 pages.

* cited by examiner

MIGRATING CLIENTS BETWEEN SERVERS

BACKGROUND

In a system comprising many servers and many clients there may be many situations where it is useful to be able to migrate clients from one server to another, e.g. if a server needs to be taken down for maintenance. If the sessions which run on a server are relatively short (e.g. 30-60 minutes long), clients will naturally migrate between servers when one session ends and they join another session; however, if the sessions last for a long time (e.g. days rather than minutes or hours) with clients able to join and leave during a session, then finding a time when no clients are connected to a server (e.g. so that the server can be taken down for maintenance) may not be possible or at best may be problematic.

Consequently, clients will need to be migrated during a session and during the migration operation user interaction cannot continue and so the user may be presented with a visible loading screen.

The embodiments described below are not limited to implementations which solve any or all of the disadvantages of known methods of migrating clients between servers.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

Methods of migrating clients from a first server to a second server are described. The first server sends a message to the second server identifying a set of clients to be migrated, serializes the state of one or more objects associated with the set of clients and transmits the serialized state to the second server. The first server then instructs each client in the set of clients to establish a connection to the second server such that each client is connected in parallel to both the first and second servers with the connection to the first server as a primary connection and the connection to the second server as a secondary connection. When all the clients from the set of clients are connected to the second server, the first server instructs the clients to disconnect from the first server and switch the primary connection to be the connection with the second server.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
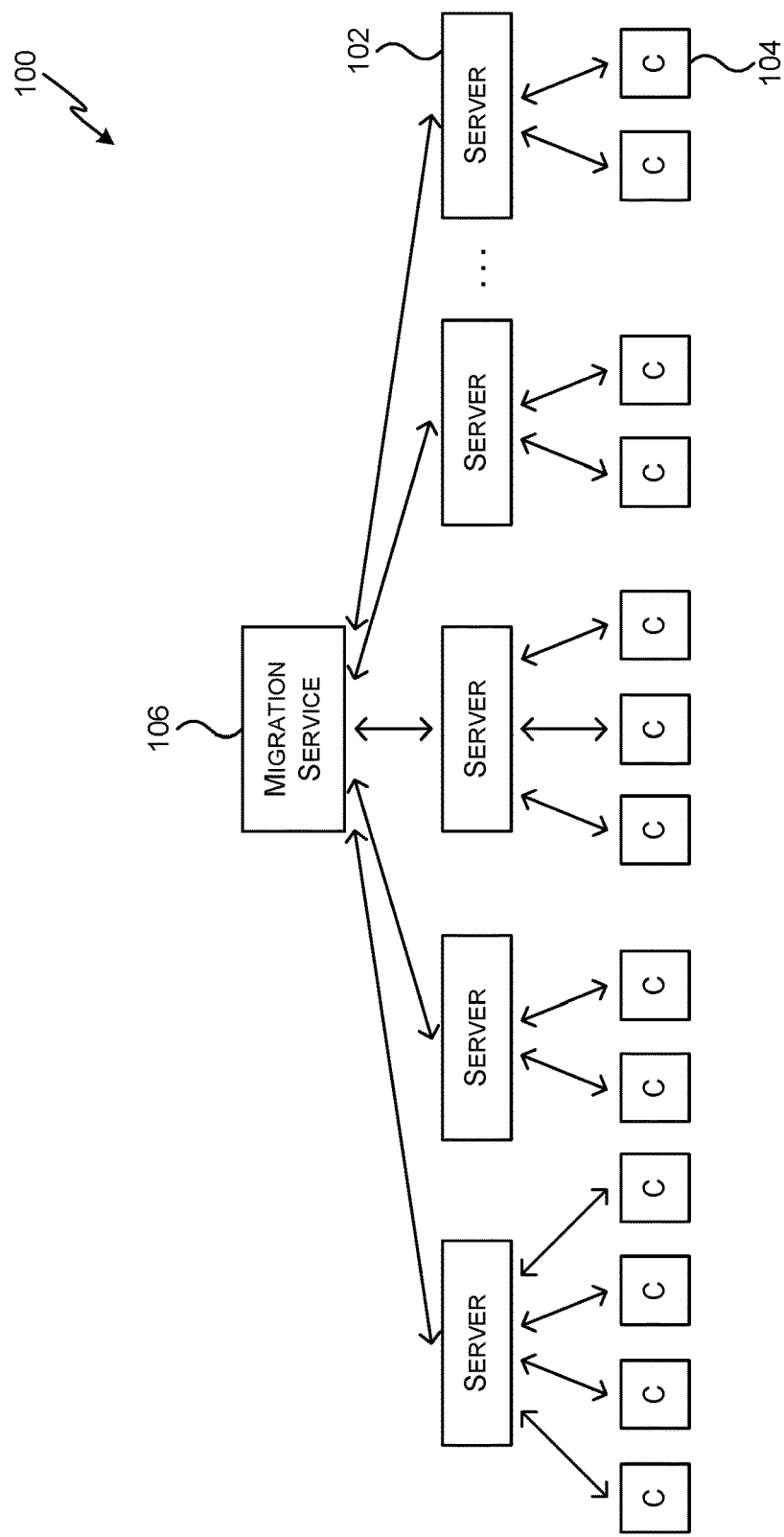
FIG. 1 is a schematic diagram of a system comprising a plurality of servers and a plurality of clients.

The detailed description provided below in connection with the appended drawings is intended as a description of the present examples and is not intended to represent the only forms in which the present example are constructed or utilized. The description sets forth the functions of the example and the sequence of operations for constructing and operating the example. However, the same or equivalent functions and sequences may be accomplished by different examples.

As described above, in a system comprising many servers and many clients there may be many situations where it is beneficial (or necessary) to migrate clients from one server to another, e.g. if a server needs to be taken down for maintenance. If the periods of use (e.g. a gaming session) last for a long time (e.g. days rather than minutes or hours) with clients joining and leaving during a session, then finding a time when no clients are connected to a server (e.g. so that the server can be taken down for maintenance) may be very difficult.

Described herein is a method of migrating clients (e.g. groups of clients) between servers (e.g. from a first server to a second server) that is invisible to the user (e.g. a loading screen is not displayed) and involves no user input to complete the migration process. In many examples the method of migrating clients described herein enables user interaction (e.g. game play) to continue seamlessly whilst the migration occurs and in other examples there may be a short period when user input is disabled (e.g. where this short period may be the whole of or part of the time taken to perform the migration, which may be around 2 seconds). This means that it is possible to migrate clients more often as they will not experience any significant interruption and migrations can be performed at short notice because it is not necessary to plan ahead to minimize disruption to users. Whilst the methods enable migrations to be performed at short notice, the methods may also be used to perform planned migrations.

In examples where the server is a game server and generates a game world and the clients control characters within that game world, the migration of clients does not change the position of the client-controlled characters within the game world. Instead the characters move from a position in a first game world on the first server to exactly the same position in a second game world on the second server and the transition is invisible to the user.

In the methods described herein, the migration is performed by instructing the clients being migrated (e.g. a set of clients) who are initially connected to a first server (denoted server A) to each establish a parallel connection to a second server (denoted server B). The connection between each client and server A is initially the primary connection and the connection between each client and server B is initially the secondary connection. Consequently, although the clients may receive state update messages from server B, these are not implemented by the client but are instead queued. Once all the clients that are being migrated (e.g. all of the clients in the set of clients) have established the parallel (and secondary) connection to server B, the clients are triggered to switch their primary connection to be the connection to server B and to disconnect from server A. At this time, any state updates received from server B which have been queued are implemented at the client and the migration is complete.

Using the methods described herein, groups (or sets) of clients may be migrated together from a first server (server A) to a second server (server B). The group of clients may be all those clients currently connected to the first server or a subset of those clients (e.g. if the first server is removed for maintenance, the set of clients being migrated may comprise all those clients connected to the first server or alternatively, the clients connected to the first server may be divided into multiple sets with different sets being migrated to different servers). In various examples the decision regarding which clients to migrate may be made by a migration service which may be separate from or integrated into one of the servers.

The ability to migrate clients between servers in a seamless manner (i.e. without any disruption to the users) or with only very brief disruption (e.g. for a matter of a few seconds at a maximum) increases the reliability of the system (for example because it is possible to take servers down regularly for maintenance or updates, e.g. every 48 hours), increases the efficiency of the system (e.g. because servers with only a few clients can have their clients migrated to another server and then those servers with no clients can be powered down) and enables load balancing between servers (e.g. such that servers in a system all have similar numbers of clients connected to them and/or to ensure that servers have a small number of free slots for new clients to join, e.g. so that a player is always able to join a friend's game which is in progress). Furthermore, where the servers are game servers, user experience may be dependent, at least in part, on player density (e.g. with increased player density improving the user experience) and by migrating clients, the player density can be maintained above a threshold level wherever possible on servers by migrating clients between servers as clients join and leave a gaming session.

In the methods described herein, the servers (e.g. server A and server B) communicate directly in order to perform the migration of clients. In alternative methods, the migration may go through an intermediary; however, this increases the latency of the migration process. In further alternative methods, the client may act as the intermediary, such that the serialized state is sent from the first server to the client and then from the client to the second server; however, this both increases latency and introduces a security risk (e.g. because the client is provided with a lot of state information that is otherwise only used by the servers).

FIG. 1 is a schematic diagram of a system 100 comprising a plurality of servers 102 and a plurality of clients 104. In an example system 100 there may be hundreds or thousands of servers 102 and thousands of clients 104. As shown in FIG. 1, each client 104 connects to one of the servers 102 in the system 100. In various examples the servers 102 may be games servers and the clients 104 may be any type of personal computing device (e.g. a desktop or laptop computer, a tablet computer, a smart phone or a gaming console, etc.). As also shown in FIG. 1, the system 100 may additionally comprise a migration service 106 that controls the migration of clients between servers, e.g. the migration service 106 may decide which clients are migrated from a first server (server A) to a second server (server B) and when the migration occurs. In other examples, however, these decisions may be made by one or more of the servers 102 in the system or may be made in any other way.

Figure 2:
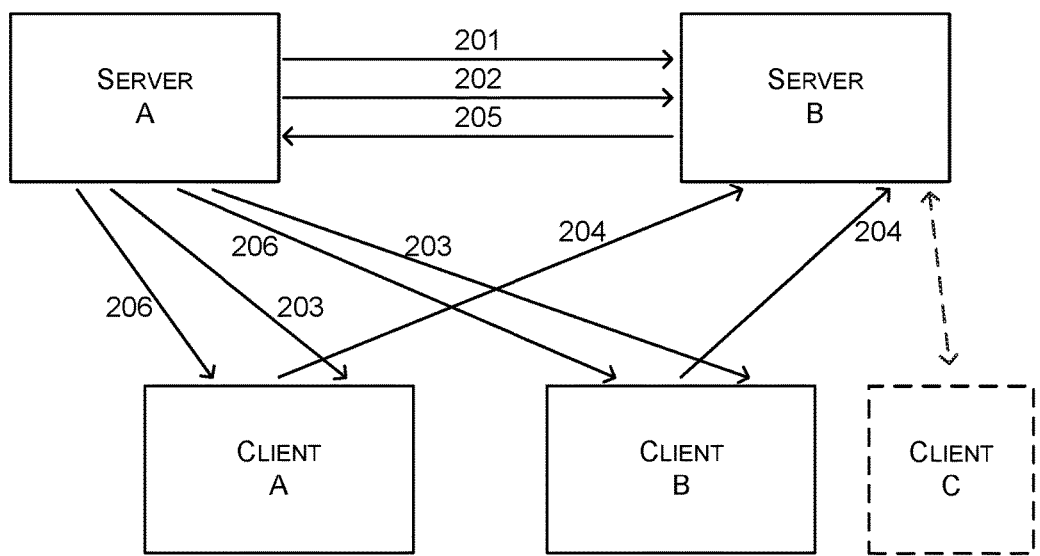
FIG. 2 is a schematic diagram showing the message flow between a first server, a second server and a set of clients.

The migration of a set of clients (e.g. a single client or a plurality of clients) between servers in the system 100 of FIG. 1 can be described with reference to FIGS. 2-5. FIG. 2 is a schematic diagram showing the message flow between a first server (server A), a second server (server B) and a set of clients comprising a first client (client A) and a second client (client B). FIG. 2 also shows a third client (client C) which is connected to the second server (server B) and is not part of the set of clients being migrated.

In the examples described herein, the set of clients (e.g. client A and client B) are migrated from the first server (server A) to the second server (server B); however, the method may be applied to migrate any number of clients from any server in the system to any other server in the system. At any point in time, there may be none, one or more migration operations happening in parallel in the system 100.

Figure 3:
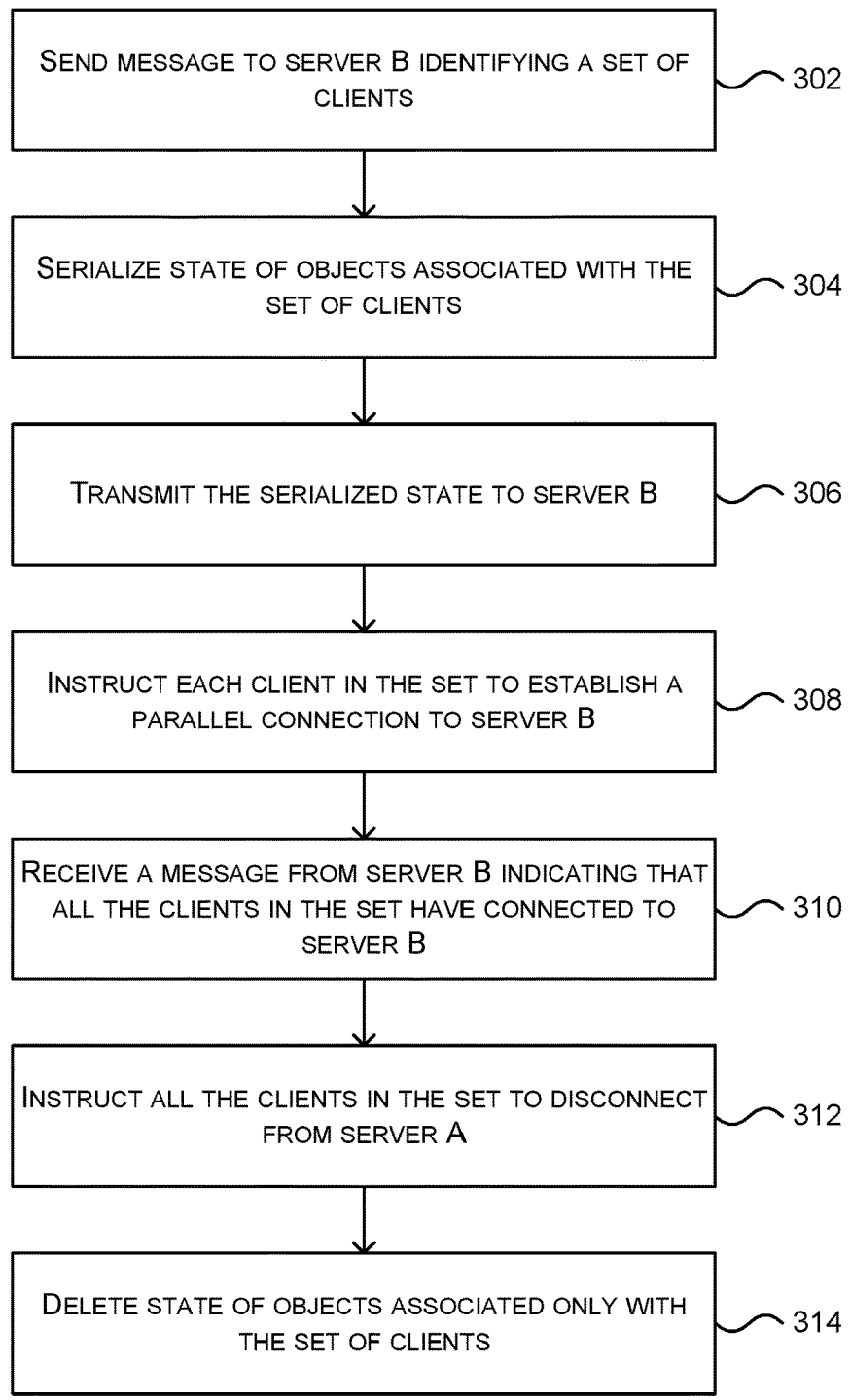
FIG. 3 is a flow diagram of an example method of operation of the first server in FIG. 2.
Figure 4:
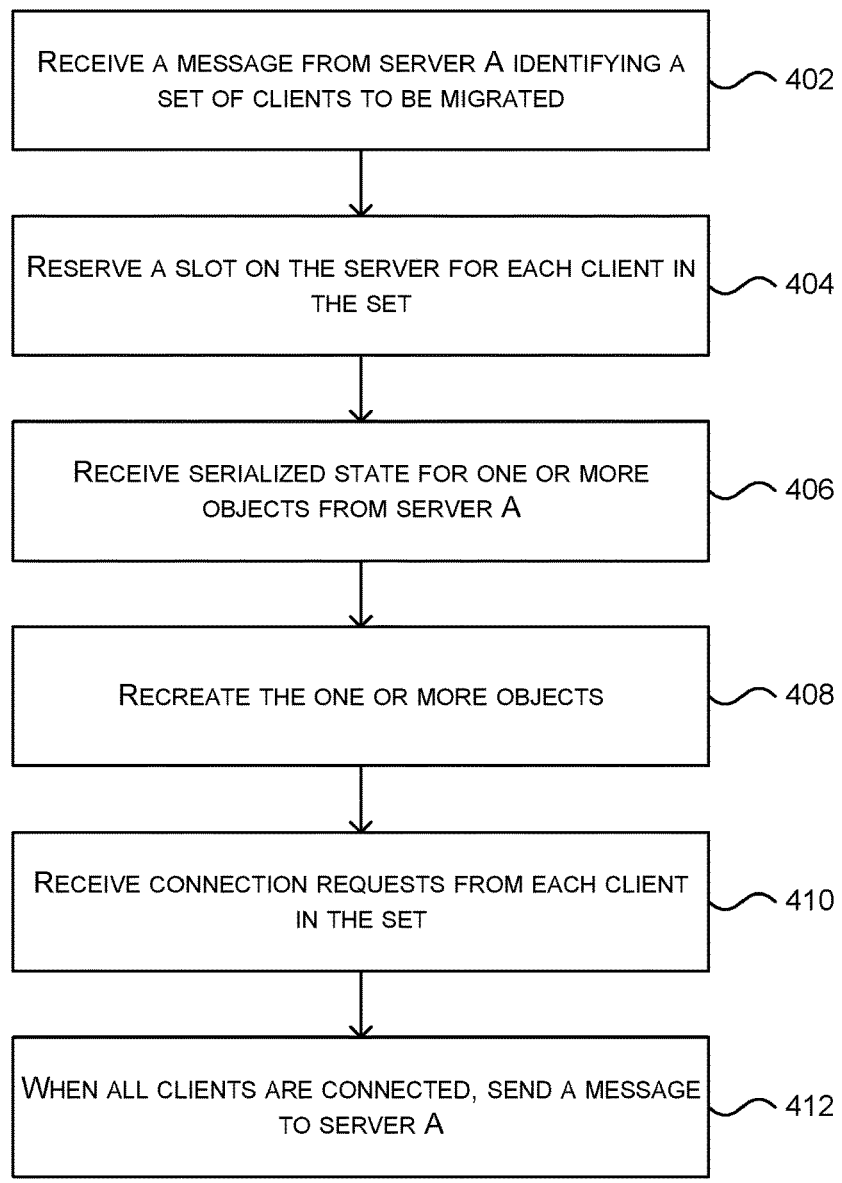
FIG. 4 is a flow diagram of an example method of operation of the second server in FIG. 2.
Figure 5:
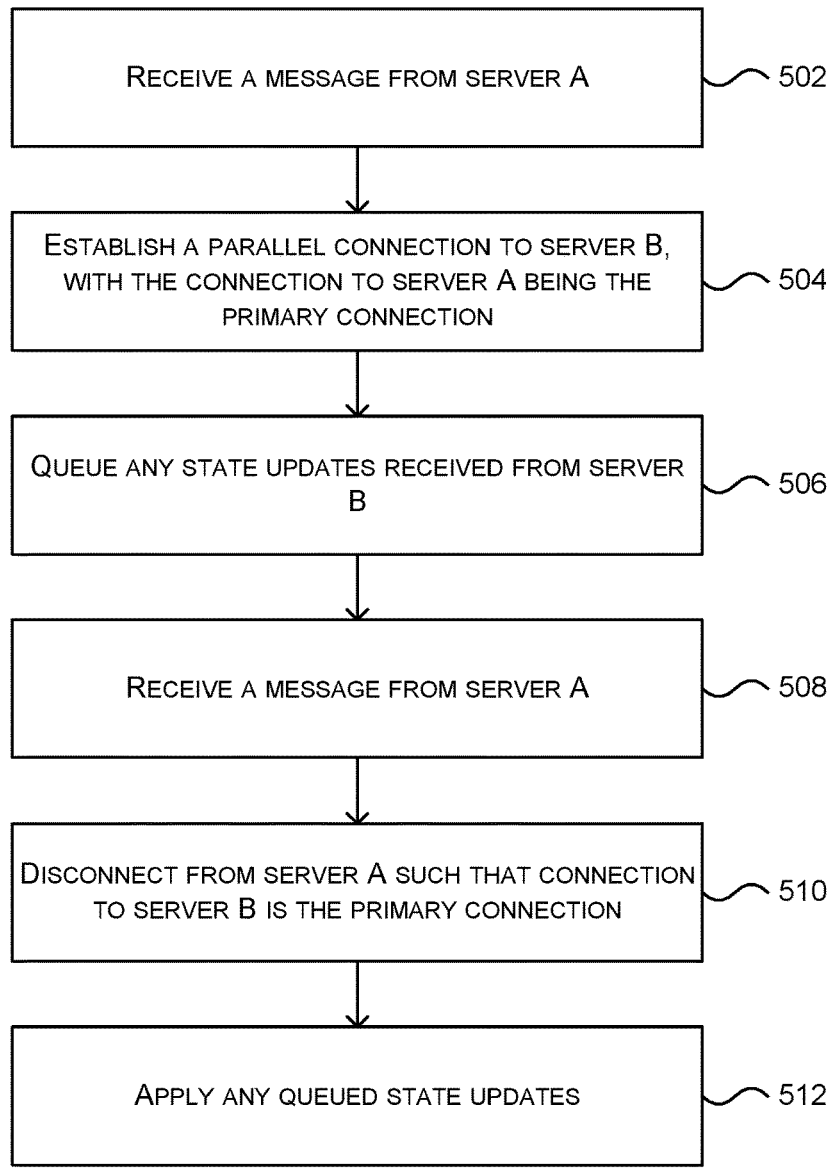
FIG. 5 is flow diagram of an example method of operation of a client in FIG. 2.

FIG. 3 is a flow diagram of an example method of operation of the first server (server A) and FIG. 4 is a flow diagram of an example method of operation of the second server (server B). FIG. 5 is flow diagram of an example method of operation of a client (e.g. as implemented separately by both client A and client B in the example of FIG. 2).

As shown in FIGS. 2 and 3, the first server (server A) establishes a connection to the second server (e.g. a TCP connection) and sends a message to the second server over the connection identifying a set of clients (e.g. client A and client B) to be migrated (arrow 201, block 302). In various examples the message may comprise the IDs of the individual clients or an ID which corresponds to a group of clients (e.g. a team of clients, which may be of a fixed size, such as four clients). The first server (server A) then serializes the state of one or more objects associated with the set of clients (block 304), where this state includes the IDs for the objects. In an example where each client controls a character within a gaming session running on the first server, the objects that are serialized may be the state of the client-controlled character, any objects which are owned by (e.g. which are in the inventory of) the character, objects which are close to the character (e.g. any objects which are visible to the user within the graphical user interface displayed on the client) or which are otherwise known to the character (e.g. objects that have been observed by a user within the graphical user interface displayed on the client), the state of any artificial intelligence (AI) characters close to the character, etc.

As shown in FIGS. 2 and 4, the second server (server B) receives the connection request from the first server and the message sent by the first server (server A) over the established connection between the first and second servers (arrow 201, block 402). The message that is received by the second server (server B) identifies a set of clients (e.g. client A and client B) to be migrated. In response to receiving the message, the second server (server B) reserves a slot on the server (i.e. on server B) for each client in the set of clients (block 404). By reserving a slot for each of the clients which are about to be migrated to the server (in block 404), this prevents the resources on the server being allocated to another client before the migration is completed (e.g. if another server, server C, not shown in FIG. 2, attempts to migrate a set of clients to server B before the migration of clients from server A to server B is complete).

As shown in FIGS. 2-4, the first server (server A) transmits the serialized state from the first server to the second server (arrow 202, block 306) and this serialized state is received at the second server (block 406). In response to receiving the serialized state (in block 406), the second server (server B) uses the state to recreate the one or more objects (block 408) on the second server (server B). If any of the serialized state that is received relates to an object which is already present on the second server (server B), e.g. as determined because the objects have the same object ID, then this object is not recreated but is instead updated based on the serialized state that was received from the first server (server A).

In an example where each client controls a character within a gaming session running on the first server, the objects that are recreated on the second server may become visible within the gaming session running on the second server, e.g. to users of clients already connected to server B (e.g. client C) that are controlling characters within the gaming session running on the second server. However, at this stage, the clients being migrated (e.g. clients A and B) are still interacting with the first server (server A) and so are not actively controlling any of the recreated objects in the gaming session on the second server (server B).

As shown in FIGS. 2 and 3, the first server (server A) instructs each client in the set of clients (e.g. client A and client B) to establish a connection to the second server (server B) such that each client is connected in parallel to both the first and second servers with the connection to the first server as a primary connection and the connection to the second server as a secondary connection (arrows 203, block 308).

As shown in FIGS. 2 and 5, each client in the set of clients being migrated (e.g. client A and client B) receives the message from the first server (server A) instructing the client to establish a connection to the second server (arrows 203, block 502) and in response, each client establishes a connection to the second server (arrows 204, block 504). As shown in FIGS. 2 and 4, the second server (server B) receives connection requests from each client in the set of clients (arrows 204, block 410). Connections are therefore established between each of the clients (e.g. client A and client B) and the second server (server B) such that each client is connected in parallel to both the first and second servers with the connection to the first server (server A) as a primary connection and the connection to the second server (server B) as a secondary connection.

As described above, whilst the clients are connected in parallel to both the first and second servers, the clients are still active in the session (e.g. the gaming session) running on the first server (server A) because that is the primary connection and hence may receive state updates from the first server (server A). In addition they may also receive state updates from the second server (server B), e.g. because the characters and objects have been recreated on the second server (server B) and their state may be affected by events within the session on the second server (server B), e.g. as a consequence of other clients (e.g. client C) connected to the same session on the second server. Consequently the clients that are being migrated (e.g. client A and client B) queue any state updates received over the secondary connection, i.e. from the second server (block 506), and implement only those state updates received over the primary connection i.e. from the first server.

When all the clients in the set of clients (e.g. client A and client B) are connected to the second server (server B), the second server (server B) sends a message to the first server (server A) to trigger disconnection of the clients (e.g. client A and client B) from the first server (server A) followed by the switching of the primary connections to be the connection with the second server (arrow 205, block 412).

In response to receiving the message at the first server (server A) indicating that all the clients in the set of clients are connected to the second server (arrow 205, block 310), the first server (server A) instructs the clients in the set of clients being migrated (e.g. client A and client B) to disconnect from the first server (server A) and switch the primary connection to be the connection with the second server (arrows 206, block 312).

In response to receiving a message from first server (server A) instructing the client to disconnect from the first server (arrows 206, block 508), each client disconnects the connection to the first server (server A) and switches the primary connection to be the connection with the second server (block 510). At this point the client becomes active in the session running on the second server (server B) as that is the primary (and in this case, only) connection and any queued state updates that were received from the second server (server B) are applied (block 512).

At this point the migration of the set of clients (e.g. client A and client B) from the first server (server A) to the second server (server B) is complete and if the migration was performed to enable the first server to be taken down for maintenance or any other reason (e.g. power saving), then the first server may be shut down. In examples where the first server (server A) is not being shut down, e.g. where the migration was performed for load-balancing or another reason, the first server (server A) may then delete any state associated with the clients that have been migrated away from that server (block 314). For example, the first server may delete any state of objects which are associated only with the migrated clients or the first server may delete the state of any dynamic migrated objects but not the state of any static migrated objects (where static objects are objects that always exist within the virtual world whereas dynamic objects do not). This reduces the amount of obsolete state data stored at the first server (server A) and enables the data storage to be used for storing other data.

The migration process described above is performed in a short period of time (e.g. approximately two seconds). The speed of the migration reduces the divergence that occurs between the state of the objects associated with the set of clients on the two servers (server A and server B). This divergence may arise from changes in state on either or both of the first and second servers in the interval between the serialization of the state on the first server (in block 304) and completion of the migration. Any divergence may result in a discontinuity in the state at the point that the primary connection is switched from the first server to the second server (e.g. because state updates that occurred on the first server after the serialization will not have been implemented on the second server).

In some examples, the migration may not complete successfully, e.g. because not all of the clients in the set are able to establish a parallel connection to the second server (in block 504). In such cases, the migration for those clients which are unable to establish the parallel connection to the second server or otherwise complete the migration is rolled back and the slots reserved on the second server (in block 404) for those clients are released (i.e. unreserved) and the objects associated only with those clients which failed to migrate which were created (in block 408) using the serialized state (received in block 406) are deleted. The migration for the other clients in the set (e.g. who are able to establish the parallel connection to the second server) may be allowed to complete.

Alternatively, the migration may only be allowed to succeed if all the clients in the set can migrate together. In such examples, a message is sent to all the clients in the set of clients instructing the clients in the set of clients being migrated (e.g. client A and client B) to disconnect from the second server (server B) and maintain the primary connection to the first server (server A) and the migration is rolled back (as described above) for all the clients in the set.

It will be appreciated that the migration process has been described above with reference to FIG. 2 which shows two clients (client A and client B) being migrated. In other examples a single client may be migrated or more than two clients may be migrated. At any point in time a particular server (e.g. server B) may be involved in multiple migrations as long as there is capacity to accommodate all the incoming clients on the recipient server (i.e. second server in the terminology used above), e.g. server A may be migrating a set of clients to server B at the same time as server C is migrating a set of clients to server B. In contrast, a client can only be involved in a single migration at any time.

As described above the migration of a set of clients between servers (e.g. from server A to server B) may be triggered by a migration service 106 and the servers 102 may not have any awareness of the presence and/or state of other servers in the system 100 prior to the start of the migration process. The migration service 106 operates independently of the migration process described above, but receives sufficient information from the servers 102 in the system (and/or the clients 104) to enable the migration service 106 to make decisions about when to trigger a migration.

In such examples, each of the servers 102 may transmit regular 'heartbeats' or periodic event messages (e.g. triggered by events or activities on the server) to the migration service 106. In various examples a server 102 may send any combination of regular heartbeat messages and periodic event messages. These messages (whether regular 'heartbeat' messages or periodic event messages) provide the migration service 106 with information regarding the clients 104 connected to the server 102. For example, a message may comprise information identifying all the clients 104 currently connected to the server 102 and optionally the positions of client-controlled characters within the session on the server 102 (e.g. their positions within a game world running on the server). In various examples, the first and second servers involved in a migration may send messages indicating the status of the migration process (e.g. at the completion of the migration or at multiple points through the migration process).

The migration service 106 monitors the activities of the servers 102 using the messages received from those servers 102 (e.g. the heartbeats or event messages) and uses these to determine when to migrate clients between servers, e.g. based on knowledge of the overall client distribution within the system 100 and optionally based on the positions of client-controlled characters on each server. As described above, migration may be performed for one of a number of different reasons including: server maintenance or repair, increasing client density, reducing power consumption (e.g. to enable a subset of the servers to be powered down), load balancing between servers (e.g. such that there is no huge disparity between the numbers of clients connected to each of the servers), improved player experience, etc.

In various examples, the set of clients for migration may be determined such that a group of client-controlled characters which are visible to each other within a session on a first server are moved together from the first server to a second server. In addition, or instead, the second server may be selected such that in the location the players occupy in the virtual (e.g. game) world, there are no existing clients on the second server. In this way, none of the users will see any visible side-effects (such as characters or objects appearing in or disappearing from their game play).

Having determined a set of clients for migration from the first server to the second server (which may involve selecting both the set of clients and the second server), the migration service 106 sends a message to the first server to trigger the migration process which then proceeds as described above with reference to FIGS. 2-5. In various examples the migration service 106 may also send a message to the second server to inform the second server that the migration has been triggered. This increases the security of the migration process because a third party cannot maliciously send migration requests to other servers (e.g. as part of a denial of service attack). In such examples if the second server receives a migration request from a first server which does not correspond to a migration that it has been informed about by the migration service 106, the second server may reject or discard the migration request from the first server. In examples where the migration service 106 informs both the first and second servers, the migration service 106 may provide both servers with an encryption key which is generated specifically (e.g. by the migration service 106) for a single migration and this may be used to encrypt data transmitted between the first and second servers.

In various examples, the first server may immediately initiate the migration process (as described above) in response to the trigger message from the migration service 106 or the first server may wait for a suitable opportunity to perform the migration. For example, the first server may perform one or more additional checks before initiating the migration. For example, the first server may perform a visibility check to determine whether there are any other client-controlled characters which have visibility of the client-controlled characters which are to be migrated (e.g. using a pre-defined visibility radius to determine which client controlled characters are sufficiently close that they may be visible). This visibility check may, for example, be performed by the first server in examples where location information is not included within the heartbeat messages or event messages (e.g. to reduce the amount of data transmitted in such messages) and therefore the migration service 106 cannot perform a visibility check. In the event that the first server determines that there are other client-controlled characters that have visibility of the client-controlled characters to be migrated, the first server may increase the size of the set of clients being migrated (e.g. to include the clients controlling any other characters that have visibility of characters controlled by clients in the set identified by the migration service 106) or send a request to the migration service 106 requesting that the set of clients being migrated is increased or the first server may abort the migration and notify the migration service 106.

In other examples, the migration service 106 may identify a migration opportunity but not the specific clients to be migrated and instead may send a message to the first server to trigger the migration of one or more clients to a second server, where the number of clients to be migrated may be identified by the migration service 106 or the first server. In such examples, in response to receiving the migration trigger message, the first server identifies a set of clients to be migrated from the first server to the second server and then continues with the migration process as described above.

The set of clients may be identified by the first server based on a pre-defined visibility radius (e.g. as described above) or any other criteria.

Figure 6:
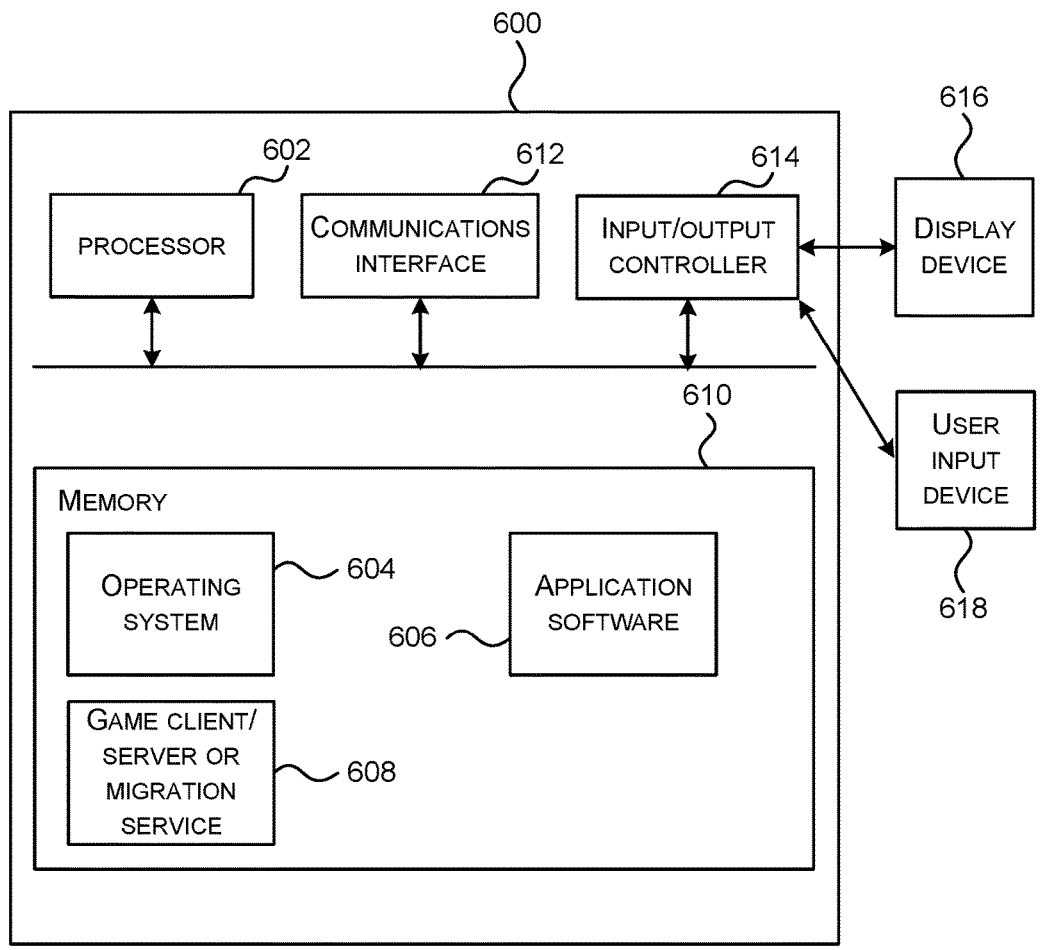
FIG. 6 illustrates an exemplary computing-based device in which embodiments of the methods of migrating clients are implemented.

FIG. 6 illustrates various components of an exemplary computing-based device 600 which are implemented as any form of a computing and/or electronic device, and in which embodiments of the methods described herein are implemented in some examples. The computing-based device 600 may be a server 102 or a client 104 in the system 100 shown in FIG. 1. In other examples, the computing-based device 600 may implement the migration service 106.

Computing-based device 600 comprises one or more processors 602 which are microprocessors, controllers or any other suitable type of processors for processing computer executable instructions to control the operation of the device in order to implement the migration of clients from one server to another server. In some examples, for example where a system on a chip architecture is used, the processors 602 include one or more fixed function blocks (also referred to as accelerators) which implement a part of the method of client migration in hardware (rather than software or firmware). Platform software comprising an operating system 604 or any other suitable platform software is provided at the computing-based device to enable application software 606 to be executed on the device. Depending upon whether the computing-based device 600 is acting as a server 102, client 104 or migration service 106, the application software may comprise a game client or game server or migration service 608.

The computer executable instructions are provided using any computer-readable media that is accessible by computing based device 600. Computer-readable media includes, for example, computer storage media such as memory 610 and communications media. Computer storage media, such as memory 610, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 610) is shown within the computing-based device 600 it will be appreciated that the storage is, in some examples, distributed or located remotely and accessed via a network or other communication link (e.g. using communication interface 612).

The communication interface 612 enables the computing-based device 600 to communicate with other computing-based devices within the system 100 shown in FIG. 1. In examples where the computing-based device 600 operates as a server 102, the communication interface 612 may be arranged to transmit and receive messages to/from other servers and in various examples to transmit the heartbeat messages and/or event messages to a migration service 106. In examples where the computing-based device 600 operates as a client 104, the communication interface 612 may be arranged to transmit and receive messages to/from servers 102.

In various examples, the computing-based device 600 also comprises an input/output controller 614 arranged to output display information to a display device 616 which may be separate from or integral to the computing-based device 600. The display information may provide a graphical user interface. The input/output controller 614 may also be arranged to receive and process input from one or more devices, such as a user input device 618 (e.g. a mouse, keyboard, camera, microphone or other sensor). In some examples the user input device 618 detects voice input, user gestures or other user actions and provides a natural user interface (NUI). This user input may, for example, be used to control a client controlled character (e.g. if the computing-based device 600 is a client 104). In an embodiment the display device 616 also acts as the user input device 618 if it is a touch sensitive display device. The input/output controller 614 may also output data to devices other than the display device in some examples.

Any of the input/output controller 614, display device 616 and the user input device 618 may comprise NUI technology which enables a user to interact with the computing-based device in a natural manner, free from artificial constraints imposed by input devices such as mice, keyboards, remote controls and the like. Examples of NUI technology that are provided in some examples include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that are used in some examples include intention and goal understanding systems, motion gesture detection systems using depth cameras (such as stereoscopic camera systems, infrared camera systems, red green blue (RGB) camera systems and combinations of these), motion gesture detection using accelerometers/gyroscopes, facial recognition, three dimensional (3D) displays, head, eye and gaze tracking, immersive augmented reality and virtual reality systems and technologies for sensing brain activity using electric field sensing electrodes (electro encephalogram (EEG) and related methods).

In various examples, the migration method may be implemented in software (e.g. with the computer-executable instructions being stored in memory 610). Alternatively, or in addition, the functionality described herein is performed, at least in part, by one or more hardware logic components. For example, and without limitation, illustrative types of hardware logic components that are optionally used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

Although the present examples are described and illustrated herein as being implemented in a system as shown in FIG. 1 (e.g. which includes a migration service 106), the system described is provided as an example and not a limitation. As those skilled in the art will appreciate, the present examples are suitable for application in a variety of different types of client-server systems of any size and as described above, in various examples there may not be a migration service 106 and instead the decision to migrate clients may be made by one or more of the servers 102 in the system 100.

A first further example provides a method of migrating clients from a first server to a second server, the method comprising: sending a message from the first server to the second server identifying a set of clients to be migrated; serializing, at the first server, state of one or more objects associated with the set of clients; transmitting the serialized state from the first server to the second server; instructing, by the first server, each client in the set of clients to establish a connection to the second server such that each client is connected in parallel to both the first and second servers with the connection to the first server as a primary connection and the connection to the second server as a secondary connection; and in response to receiving a message at the first server indicating that all the clients in the set of clients are connected to the second server, instructing the clients to disconnect from the first server and switch the primary connection to be the connection with the second server.

Alternatively or in addition to the other examples described herein, the first further example includes any combination of the following features:

The method may further comprise: in response to determining that all the clients in the set of clients have disconnected from the first server, deleting, at the first server, state of objects associated only with the set of clients.

The message may be sent from the first server to the second server identifying the set of clients to be migrated in response to receiving, at the first server from a migration service, a migration trigger message.

The migration trigger message may identify the second server and the set of clients to be migrated.

The migration trigger message may identify the second server and the method may further comprise: identifying, at the first server, the set of clients to be migrated.

The method may further comprise: transmitting, from the first server to a migration service, periodic messages identifying any clients currently connected to the first server.

The periodic messages may additionally identify locations within a virtual world of client controlled characters controlled by the clients currently connected to the first server.

The periodic messages may be transmitted regularly to the migration service.

The periodic messages may be transmitted to the migration service in response to an event occurring at the first server.

The method may further comprise: receiving, at a migration service, the periodic messages sent by the first server and periodic messages sent by other servers in a system; determining, at the migration service, the set of clients to be migrated and an identity of the second server using the periodic messages; and sending a migration trigger message to the first server.

The set of clients and the identity of the second server may be determined using the periodic messages and in response to a maintenance schedule for the first server.

The periodic messages may additionally identify locations within a virtual world of client controlled characters controlled by the clients currently connected to the first server and wherein the set of clients is determined based on the identified locations and a predefined visibility distance within the virtual world.

The method may further comprise: in response to determining that all clients have disconnected from the first server, powering down the first server.

A second further example provides a server comprising a processor and a memory arranged to store device-executable instructions, which when executed by the processor, cause the server to: send a message from the server to a second server identifying a set of clients to be migrated; serialize state of one or more objects associated with the set of clients; transmit the serialized state to the second server; instruct each client in the set of clients to establish a connection to the second server such that each client is connected in parallel to both the server and the second server with the connection to the server as a primary connection and the connection to the second server as a secondary connection; and in response to receiving a message at the server indicating that all the clients in the set of clients are connected to the second server, instruct the clients to disconnect from the server and switch the primary connection to be the connection with the second server.

Alternatively or in addition to the other examples described herein, the second further example includes any combination of the following features:

The device-executable instructions, when executed by the processor, may further cause the server: in response to determining that all the clients in the set of clients have disconnected from the first server, to delete state of objects associated only with the set of clients.

The message may be sent from the server to the second server identifying the set of clients to be migrated in response to receiving, at the server from a migration service, a migration trigger message.

The migration trigger message may identify the second server and the set of clients to be migrated.

The migration trigger message may identify the second server and the device-executable instructions, when executed by the processor, may further cause the server to: identify the set of clients to be migrated.

The device-executable instructions, when executed by the processor, may further cause the server to: transmit to a migration service, periodic messages identifying any clients currently connected to the server.

The periodic messages may additionally identify locations within a virtual world of client controlled characters controlled by the clients currently connected to the server.

The periodic messages may be transmitted regularly to the migration service.

The periodic messages may be transmitted to the migration service in response to an event occurring at the server.

The periodic messages may additionally identify locations within a virtual world of client controlled characters controlled by the clients currently connected to the first server and wherein the set of clients is determined based on the identified locations and a predefined visibility distance within the virtual world.

The device-executable instructions, when executed by the processor, may further cause the server: in response to determining that all clients have disconnected from the server, to power down the first server.

A third further example provides a method of migrating clients from a first server to a second server, the method comprising: in response to receiving, at the second server, a message from the first server identifying a set of clients to be migrated, reserving a slot for each client in the set of clients; in response to receiving, at the second server, serialized state from the first server, the serialized state relating to one or more objects associated with the set of clients, recreating or updating the one or more objects on the second server; receiving, at the second server, connection requests from each client in the set of clients such that each client is connected in parallel to both the first and second servers with the connection to the first server as a primary connection and the connection to the second server as a secondary connection; and in response to determining that all the clients in the set of clients are connected to the second server, sending a message to the first server to trigger disconnection of the clients from the first server and switching of the primary connections to be the connection with the second server.

Alternatively or in addition to the other examples described herein, the third further example includes any combination of the following features:

The method may further comprise: transmitting, from the second server to a migration service, periodic messages identifying any clients currently connected to the second server.

The periodic messages may additionally identify locations within a virtual world of client controlled characters controlled by the clients currently connected to the second server.

The periodic messages may be transmitted regularly to the migration service.

The periodic messages may be transmitted to the migration service in response to an event occurring at the second server.

A fourth further example provides a server comprising a processor and a memory arranged to store device-executable instructions, which when executed by the processor, cause the server to: in response to receiving, at the server, a message from a first server identifying a set of clients to be migrated, reserve a slot for each client in the set of clients; in response to receiving, at the server, serialized state from the first server, the serialized state relating to one or more objects associated with the set of clients, recreate or update the one or more objects on the server; receive, at the server, connection requests from each client in the set of clients such that each client is connected in parallel to both the server and the first server with the connection to the first server as a primary connection and the connection to the server as a secondary connection; and in response to determining that all the clients in the set of clients are connected to the second server, send a message to the first server to trigger disconnection of the clients from the first server and switching of the primary connections to be the connection with the server.

Alternatively or in addition to the other examples described herein, the fourth further example includes any combination of the following features:

The device-executable instructions, when executed by the processor, may further cause the server to: transmit to a migration service, periodic messages identifying any clients currently connected to the server.

The periodic messages may additionally identify locations within a virtual world of client controlled characters controlled by the clients currently connected to the second server.

The periodic messages may be transmitted regularly to the migration service.

The periodic messages may be transmitted to the migration service in response to an event occurring at the second server.

A fifth further example provides a method of migrating clients from a first server to a second server, the method comprising: in response to receiving, at a client, a message from the first server instructing the client to establish a connection to the second server, establishing the connection to the second server, such that the client is connected in parallel to both the first and second servers with the connection to the first server as a primary connection and the connection to the second server as a secondary connection; queuing, at the client, any state updates received from the second server; in response to receiving a message from first server instructing the client to disconnect from the first server, disconnecting the connection to the first server and switching the primary connection to be the connection with the second server; and applying, at the client, any queued state updates received from the second server.

The method may further comprise in parallel to queuing, at the client, any state updates received from the second server, applying, at the client, any state updates received from the first server.

A sixth further example provides a client computing device comprising a processor and a memory arranged to store device-executable instructions, which when executed by the processor, cause the client computing device to: in response to receiving a message from a first server instructing the client to establish a connection to a second server, establish the connection to the second server, such that the client computing device is connected in parallel to both the first and second servers with the connection to the first server as a primary connection and the connection to the second server as a secondary connection; queue any state updates received from the second server; in response to receiving a message from first server instructing the client computing device to disconnect from the first server, disconnect the connection to the first server and switch the primary connection to be the connection with the second server; and apply any queued state updates received from the second server.

The device-executable instructions, when executed by the processor, may further cause the client computing device, in parallel to queuing any state updates received from the second server, to apply any state updates received from the first server.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

This acknowledges that software is a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language)

software, as is used for designing silicon chips, or for configuring universal programmable chips, to carry out desired functions.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

The term 'subset' is used herein to refer to a proper subset such that a subset of a set does not comprise all the elements of the set (i.e. at least one of the elements of the set is missing from the subset).

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

The invention claimed is:

1. A method of migrating clients from a first server to a second server, the method comprising:
   sending a message from the first server to the second server identifying a set of clients to be migrated, wherein the set of clients comprises a plurality of remotely located clients participating in a same gaming session;
   serializing, at the first server, state of one or more objects associated with the set of clients;
   transmitting the serialized state from the first server to the second server;
   instructing, by the first server, each client in the set of clients to establish a connection to the second server such that each client is connected in parallel to both the first and second servers with the connection to the first server as a primary connection and the connection to the second server as a secondary connection; and
   in response to receiving a message at the first server indicating that all the clients in the set of clients are connected to the second server, instructing the clients to disconnect from the first server and switch the primary connection to be the connection with the second server.

2. The method according to claim 1, further comprising:
   in response to determining that all the clients in the set of clients have disconnected from the first server, deleting, at the first server, state of objects associated only with the set of clients.

3. The method according to claim 1, wherein the message is sent from the first server to the second server identifying the set of clients to be migrated in response to receiving, at the first server from a migration service, a migration trigger message.

4. The method according to claim 3, wherein the migration trigger message identifies the second server and the set of clients to be migrated.

5. The method according to claim 3, wherein the migration trigger message identifies the second server and the method further comprises:
   identifying, at the first server, the set of clients to be migrated.

6. The method according to claim 1, further comprising:
   transmitting, from the first server to a migration service, periodic messages identifying any clients currently connected to the first server.

7. The method according to claim 6, wherein the periodic messages additionally identify locations within a virtual world of client controlled characters controlled by the clients currently connected to the first server.

8. The method according to claim 6, wherein the periodic messages are transmitted regularly to the migration service.

9. The method according to claim 6, wherein the periodic messages are transmitted to the migration service in response to an event occurring at the first server.

10. The method according to claim 6, further comprising:
    receiving, at a migration service, the periodic messages sent by the first server and periodic messages sent by other servers in a system;
    determining, at the migration service, the set of clients to be migrated and an identity of the second server using the periodic messages; and
    sending a migration trigger message to the first server.

11. The method according to claim 10, wherein the set of clients and the identity of the second server is determined using the periodic messages and in response to a maintenance schedule for the first server.

12. The method according to claim 10, wherein the periodic messages additionally identify locations within a virtual world of client controlled characters controlled by the clients currently connected to the first server and wherein the set of clients is determined based on the identified locations and a pre-defined visibility distance within the virtual world.

13. The method according to claim 1, further comprising:
in response to determining that all clients have disconnected from the first server, powering down the first server.

14. A method of migrating clients from a first server to a second server, the method comprising:
in response to receiving, at the second server, a message from the first server identifying a set of clients to be migrated, reserving a slot for each client in the set of clients, wherein the set of clients comprises a plurality of remotely located clients participating in a same gaming session;
in response to receiving, at the second server, serialized state from the first server, the serialized state relating to one or more objects associated with the set of clients, recreating or updating the one or more objects on the second server;
receiving, at the second server, connection requests from each client in the set of clients such that each client is connected in parallel to both the first and second servers with the connection to the first server as a primary connection and the connection to the second server as a secondary connection; and
in response to determining that all the clients in the set of clients are connected to the second server, sending a message to the first server to trigger disconnection of the clients from the first server and switching of the primary connections to be the connection with the second server.

15. The method according to claim 14, further comprising:
transmitting, from the second server to a migration service, periodic messages identifying any clients currently connected to the second server.

16. The method according to claim 15, wherein the periodic messages additionally identify locations within a virtual world of client controlled characters controlled by the clients currently connected to the second server.

17. The method according to claim 15, wherein the periodic messages are transmitted regularly to the migration service.

18. The method according to claim 15, wherein the periodic messages are transmitted to the migration service in response to an event occurring at the second server.

19. A method of migrating clients from a first server to a second server, the method comprising:
in response to receiving, at a client, a message from the first server instructing the client to establish a connection to the second server, establishing the connection to the second server, such that the client is connected in parallel to both the first and second servers with the connection to the first server as a primary connection and the connection to the second server as a secondary connection;
queuing, at the client, any state updates received from the second server;
in response to receiving a message from first server instructing the client to disconnect from the first server, disconnecting the connection to the first server and switching the primary connection to be the connection with the second server; and
applying, at the client, any queued state updates received from the second server.

20. The method according to claim 19, further comprising:
in parallel to queuing, at the client, any state updates received from the second server, applying, at the client, any state updates received from the first server.

* * * * *